US007738336B2

(12) United States Patent
Kakimoto et al.

(10) Patent No.: US 7,738,336 B2
(45) Date of Patent: Jun. 15, 2010

(54) APPARATUS AND METHOD FOR OPTICAL INFORMATION RECORDING AND REPRODUCING

(75) Inventors: Hiroya Kakimoto, Gunma (JP); Mitsuo Sekiguchi, Gunma (JP); Fuyuki Miyazawa, Gunma (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 781 days.

(21) Appl. No.: 11/638,199

(22) Filed: Dec. 13, 2006

(65) Prior Publication Data

US 2007/0159946 A1 Jul. 12, 2007

(30) Foreign Application Priority Data

Dec. 14, 2005 (JP) ............................. 2005-360699

(51) Int. Cl.
*G11B 7/00* (2006.01)
(52) U.S. Cl. .............. 369/59.11; 369/47.53; 369/59.12; 369/59.23
(58) Field of Classification Search .............. 369/59.23, 369/59.17, 59.11, 53.31, 53.34
See application file for complete search history.

(56) References Cited

U.S. PATENT DOCUMENTS

| 6,404,713 | B1 * | 6/2002 | Ueki ........................ 369/47.53 |
| 6,628,588 | B2 | 9/2003 | Shimoda |
| 6,810,004 | B1 * | 10/2004 | Sako ........................ 369/275.4 |
| 7,088,667 | B2 | 8/2006 | Kobayashi |
| 7,158,460 | B2 | 1/2007 | Ogawa |
| 7,158,462 | B2 | 1/2007 | Ogawa |
| 7,301,870 | B2 | 11/2007 | Masui |
| 7,307,937 | B2 | 12/2007 | Ogawa |
| 2003/0086345 | A1 * | 5/2003 | Ueki ........................ 369/47.51 |
| 2004/0145978 | A1 | 7/2004 | Yamamoto |
| 2005/0163007 | A1 * | 7/2005 | Ueki ........................ 369/47.53 |
| 2008/0062842 | A1 | 3/2008 | Kishigami et al. |

FOREIGN PATENT DOCUMENTS

| EP | 1369872 A | 12/2003 |
| EP | 1426931 A | 6/2004 |
| EP | 1635337 A | 3/2006 |
| JP | 02-137133 | 5/1990 |

(Continued)

*Primary Examiner*—Wayne R Young
*Assistant Examiner*—Adam R Giesy
(74) *Attorney, Agent, or Firm*—Law Office of Katsuhiro Arai

(57) ABSTRACT

A recording condition on a media is optimized by introducing a new evaluation index. An apparatus for optical information recording and reproducing includes: a measurement means for recording codes including a specific code in a medium for optical information recording and reproducing, reproducing the codes from the medium for optical information recording and reproducing, and measuring, from a reproduced signal of the codes, a peak value of amplitude of a reproduced signal related to the specific code, the peak value being a maximum value or a minimum value of the amplitude of the reproduced signal related to the specific code; a statistic calculation means for calculating preset statistic by using a plurality of peak values at the same or different recording places, the plurality of peak value having been obtained by the measurement means; and a condition decision means for deciding at least one of a recording laser power condition and a recording pulse condition by using the statistic. The peak value and the statistic thereof serving as a new evaluation index are effective for evaluation of the apparatus for optical information recording and reproducing or setting of a recording condition in the specification.

20 Claims, 8 Drawing Sheets

FOREIGN PATENT DOCUMENTS

| | | |
|---|---|---|
| JP | 2002-100045 A | 4/2002 |
| JP | 2003-045036 A | 2/2003 |
| JP | 2003-151219 | 5/2003 |
| JP | 2005-216446 | 8/2005 |
| WO | 2004112009 A | 12/2004 |
| WO | 2005109408 A | 11/2005 |

* cited by examiner

[Fig. 1]
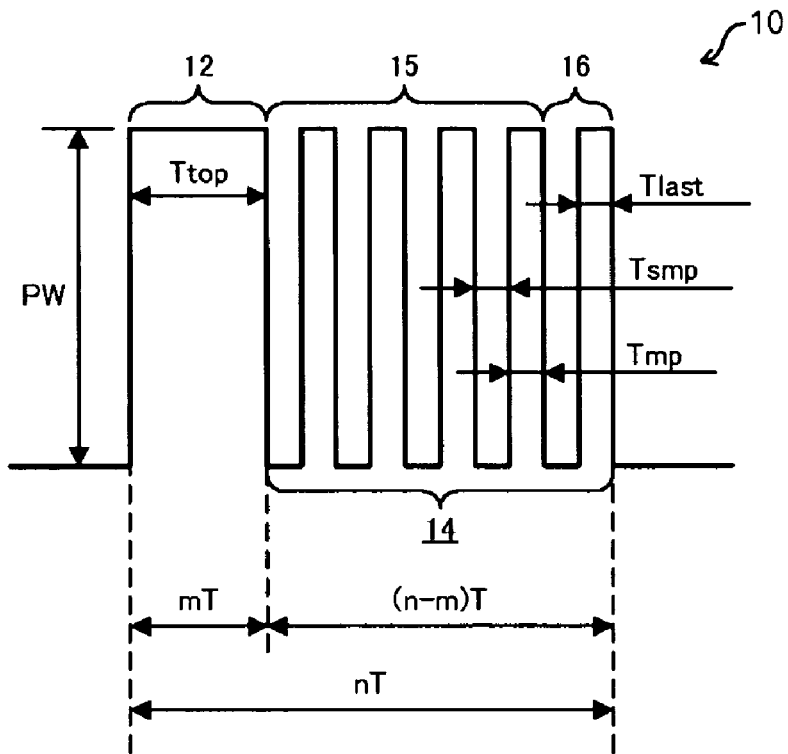
[Fig. 2]
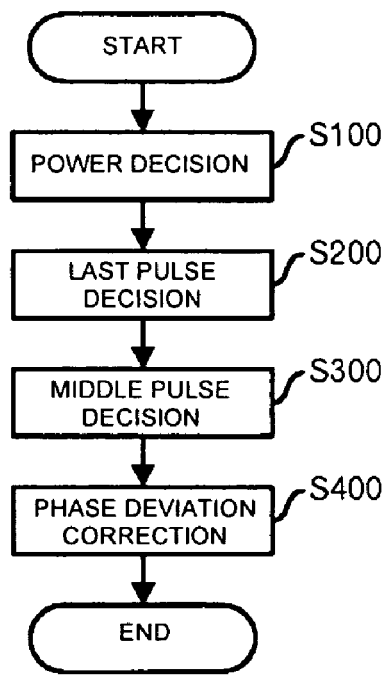

[Fig. 3]
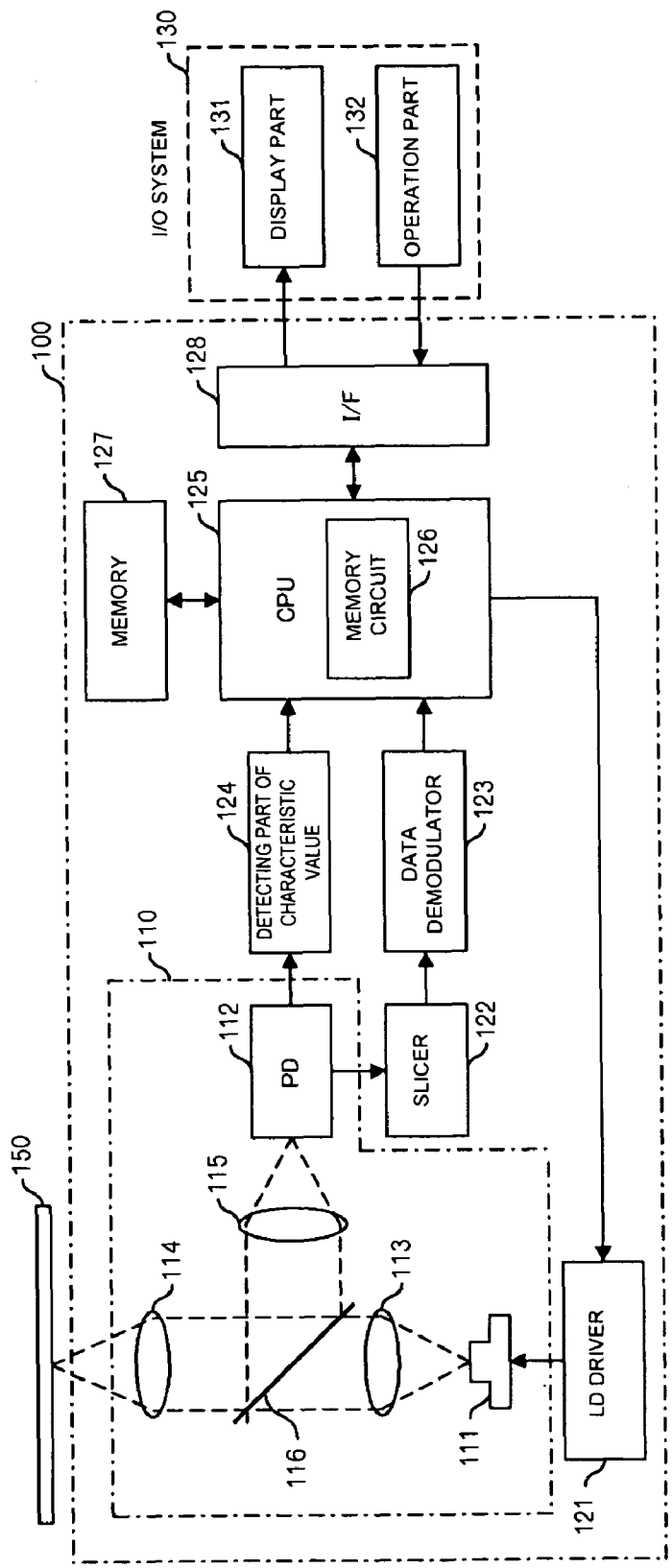

[Fig. 4]
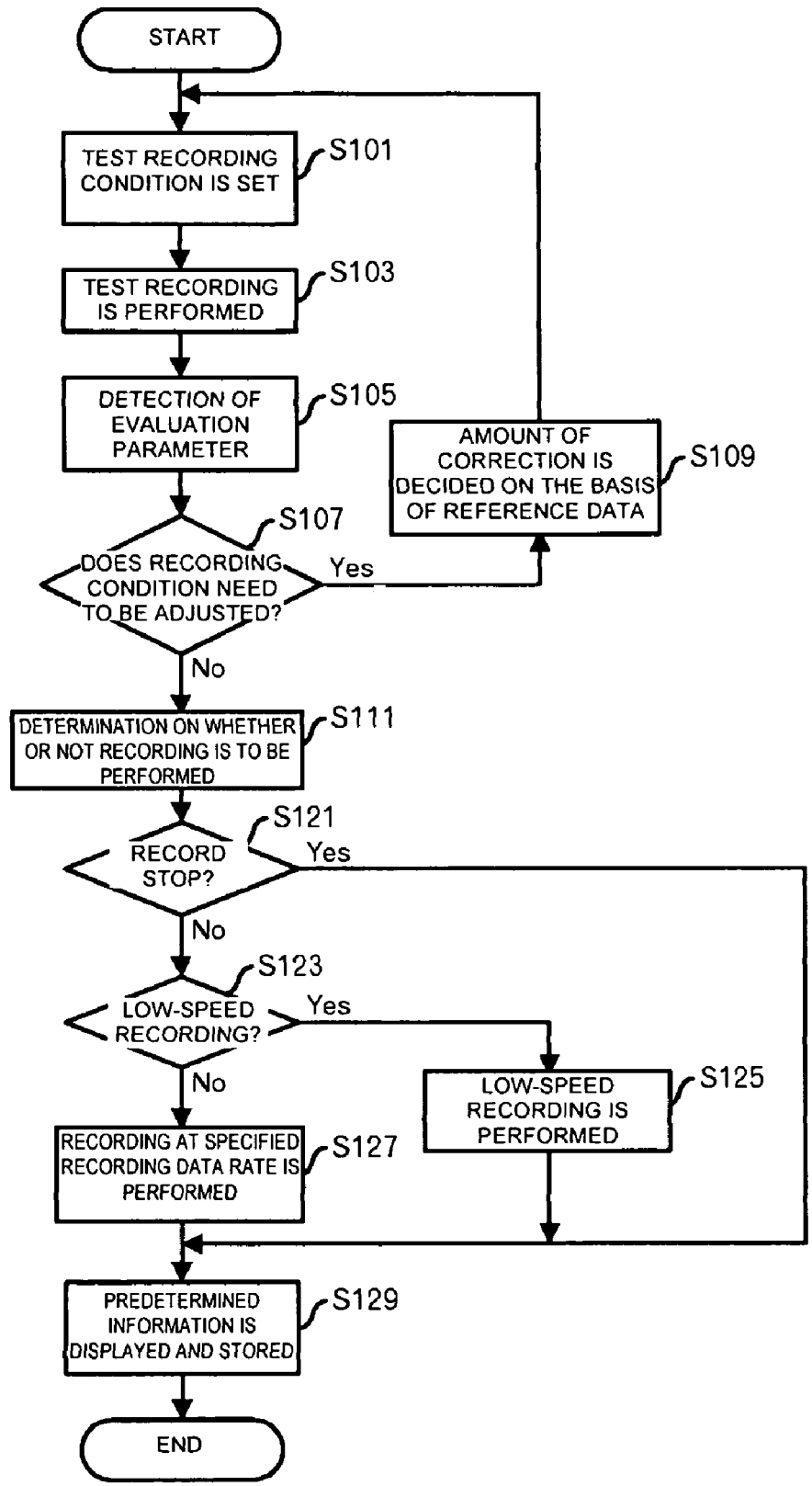

[Fig. 5]
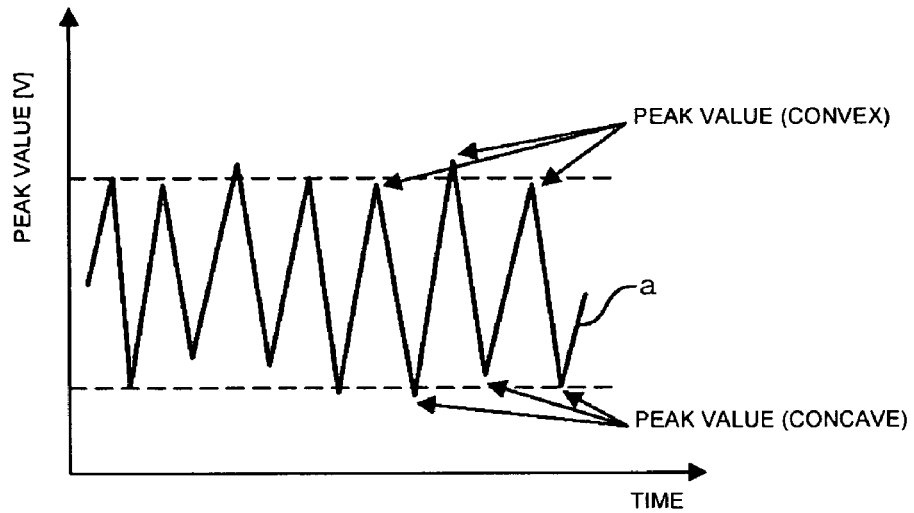
[Fig. 6]
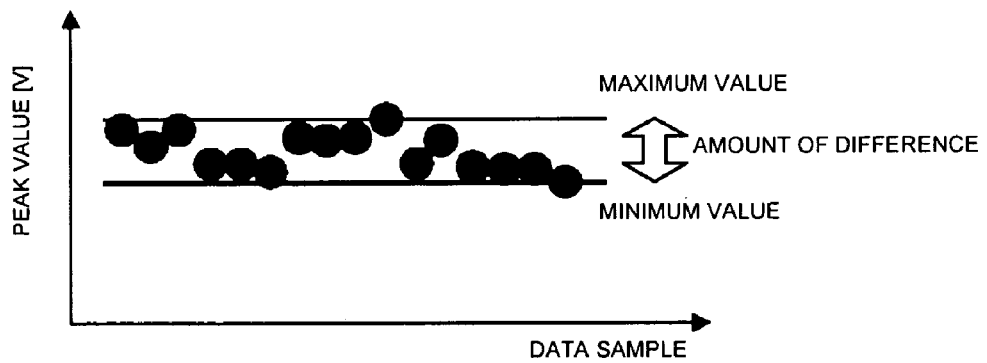
[Fig. 7]
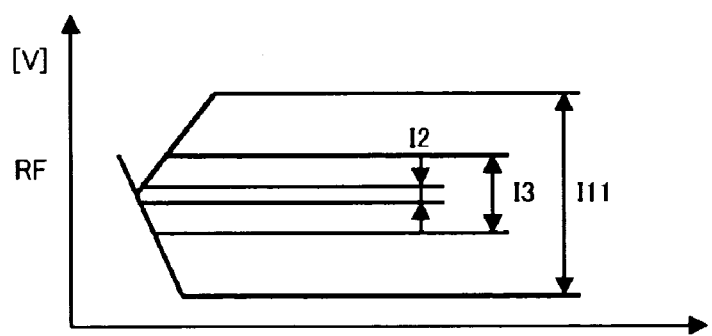

[Fig. 8]
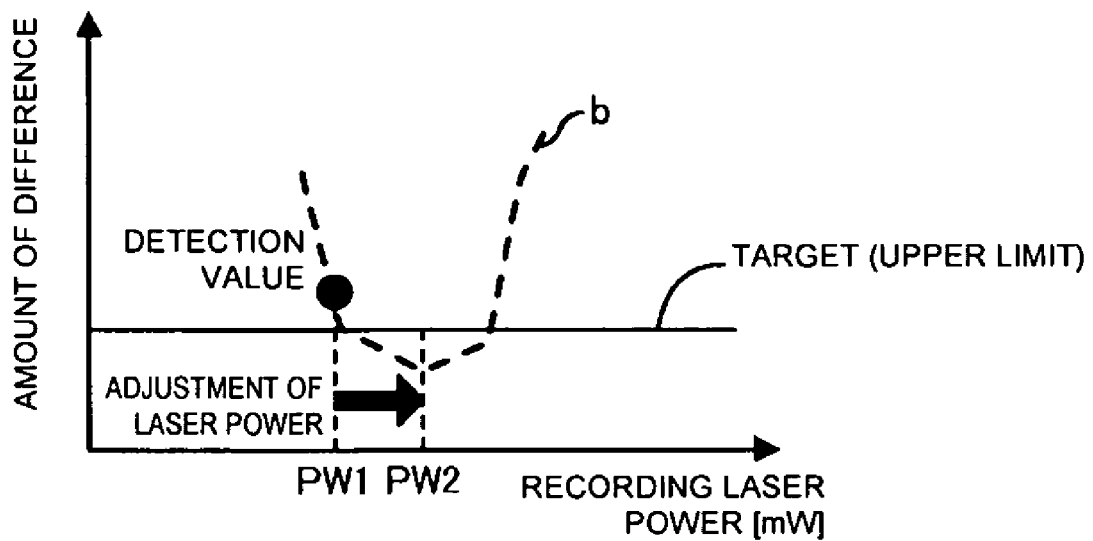
[Fig. 9]
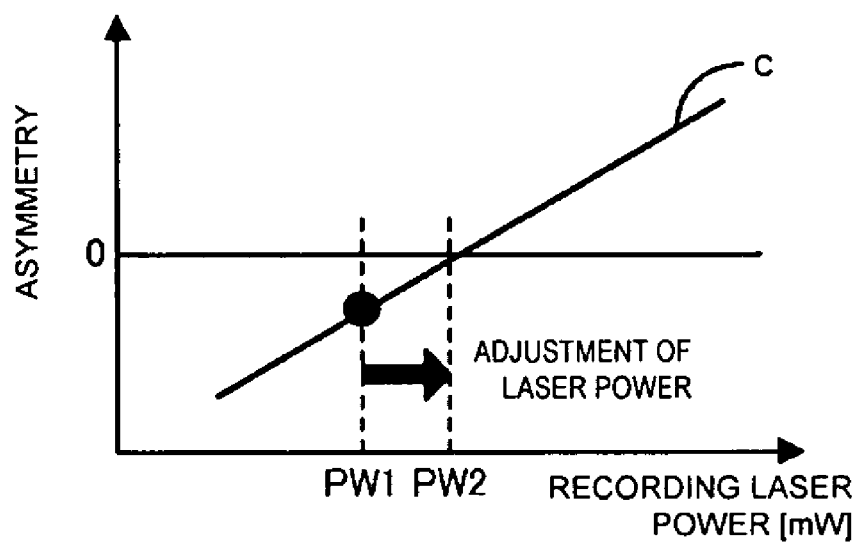

[Fig. 10]
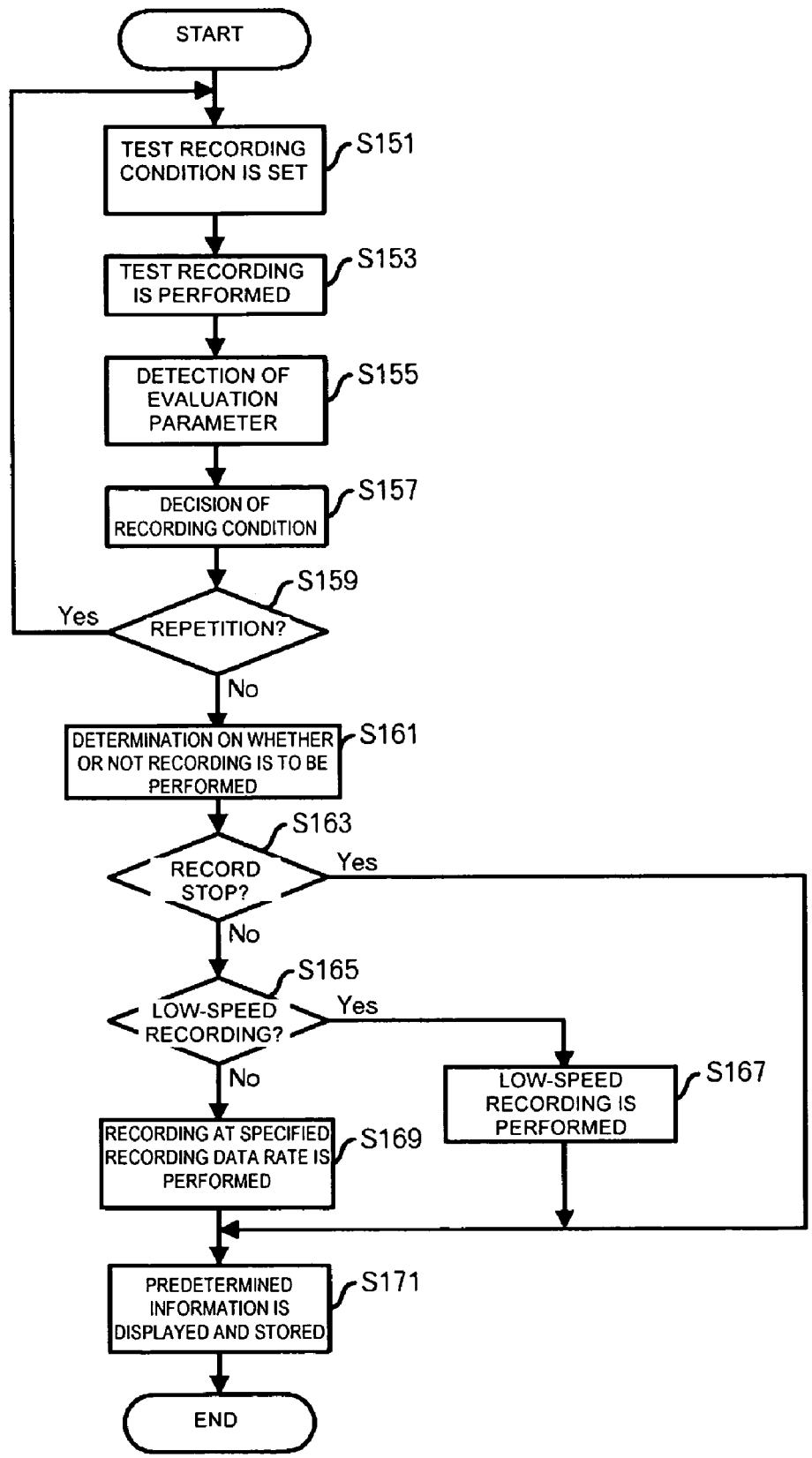

[Fig. 11]
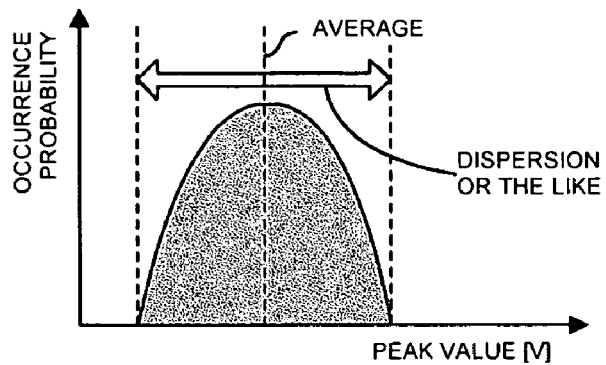
[Fig. 12]
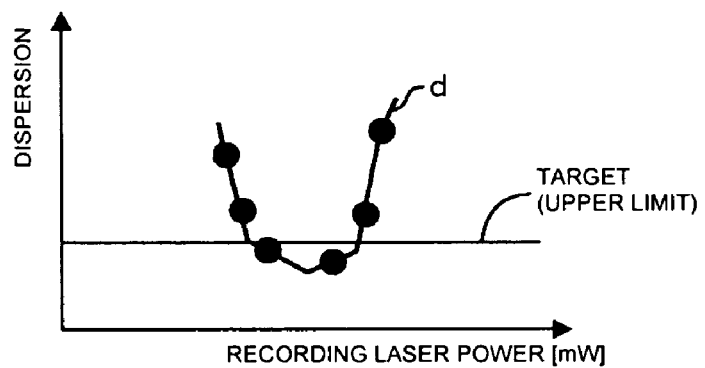
[Fig. 13]
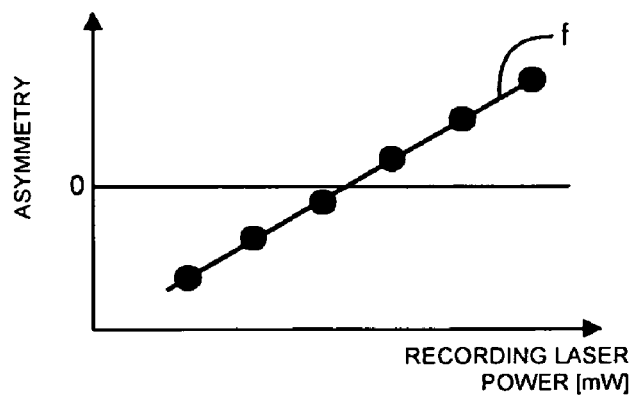

[Fig. 14]
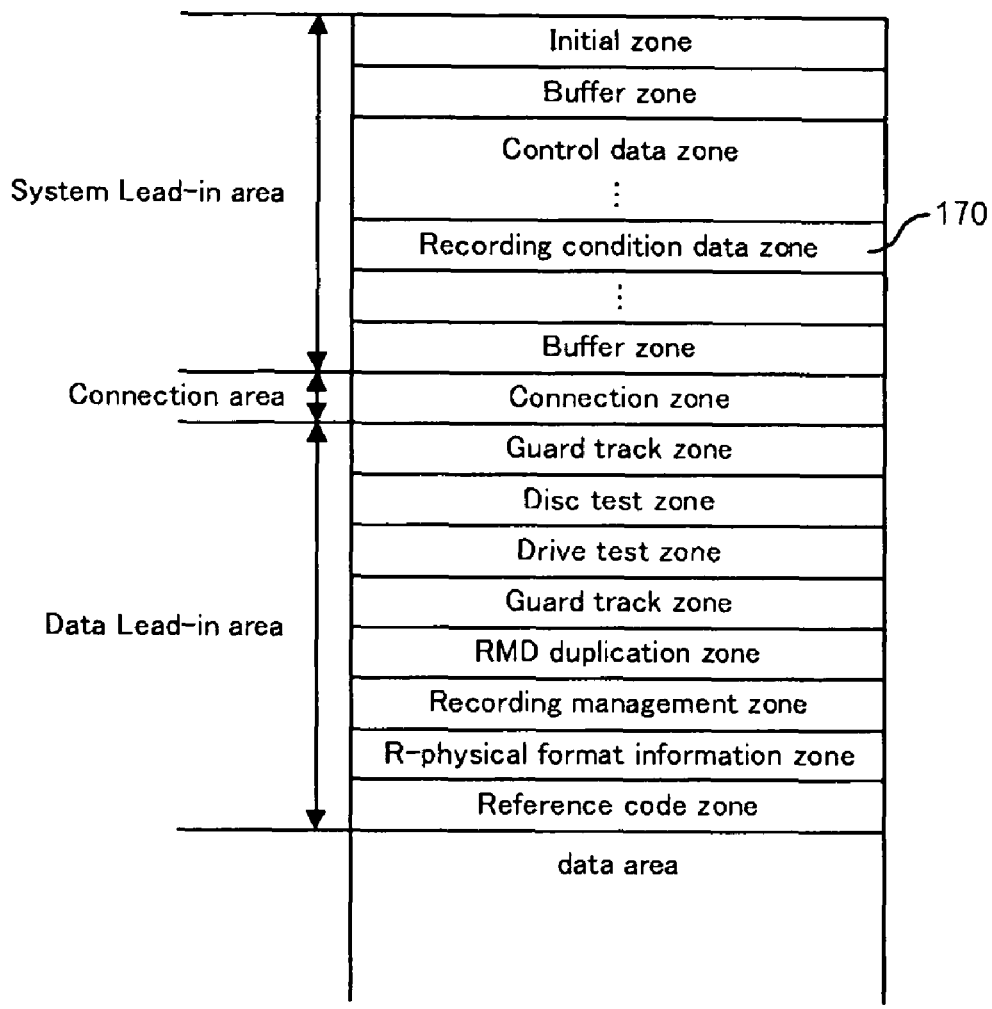
[Fig. 15]
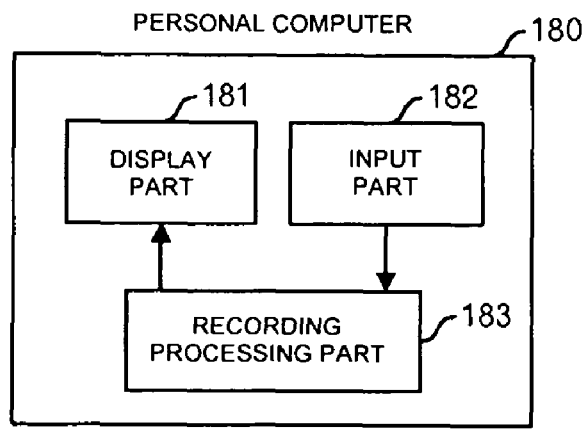

APPARATUS AND METHOD FOR OPTICAL INFORMATION RECORDING AND REPRODUCING

BACKGROUND OF THE INVENTION

1. Field of the Invention

The present invention relates to a technique for optimizing a recording condition on a medium for optical information recording and reproducing.

2. Description of the Related Technology

The quality of recording in an optical information recording system is decided by a characteristic of an apparatus for optical information recording and reproducing (hereinafter, referred to as a 'drive'), a medium for optical information recording and reproducing (hereinafter, referred to as a 'media' or a disk), and a recording condition (including recording data rate, recording laser power, recording pulse, and effect due to disturbance). In addition, the quality of recording needs to satisfy a level at which recorded data can be accurately reproduced.

A recording condition optimization technique for obtaining the proper quality of recording has been known. For example, a method is generally known in which a recording pulse condition is fixed to a predetermined initial condition and when a condition of recording laser power has been changed, the recording laser power is optimized on the basis of the change of a reproduced signal. In addition, there is also a method in which a recording pulse condition is optimized by correcting a recording pulse on the basis of a measured value of a bit error rate of a reproduced signal under an optimal condition of recording laser power.

Moreover, a known method of deciding an optimal recording condition from a reproduced signal includes a method of selecting a recording condition such that an evaluation index (for example, Jitter) of a reproduced signal satisfies a minimum, maximum, or predetermined level.

For example, JP-A-2003-151219 discloses a technique of calculating a proper amount of correction when identifying a reproduced signal on the basis of an amplitude value of a reproduced signal sample. Specifically, information recording is performed on a medium for information recording and reproducing or reproduction of recorded information is performed by using a predetermined reproduced signal, a first pattern corresponding to a signal waveform pattern of the reproduced signal, a second pattern corresponding to a signal waveform pattern of a reproduced signal other than the first pattern, and a third pattern corresponding to a signal waveform pattern of a reproduced signal other than the first and second patterns. In this method, a first distance E1 between the reproduced signal and the first pattern, a second distance E2 between the reproduced signal and the second pattern, and a third distance E3 between the reproduced signal and the third pattern are obtained. Then, a first distance difference D2=E2−E1 between the first distance E1 and the second distance E2 and a second distance difference D3=E3−E1 between the first distance E1 and the third distance E3 are obtained. Thereafter, distribution of the first distance difference D2 and distribution of the second distance difference D3 with respect to a plurality of reproduced signal samples are obtained. Then, mean M2 of the first distance difference D2 and standard deviation $\sigma 2$ of the distribution of the first distance difference D2 and mean M3 of the second distance difference D3 and standard deviation $\sigma 3$ of the distribution of the second distance difference D3 are obtained. Then, recording compensation parameters are obtained from the relation of $(\sigma 2 * M3 + \sigma 3 * M2)/(\sigma 2 + \sigma 3)$. On the basis of the recording compensation parameters obtained as above, recording waveforms with respect to the medium for information recording and reproducing are compensated. In the technique disclosed in JP-A-2003-151219, only the optimization of a recording pulse in the recording condition is performed.

In addition, JP-A-2005-216446 discloses a technique for reducing an effect due to a difference of characteristics between a rewritable optical disk and an optical disk recorder. Specifically, in a method of setting an optical recording condition of an optical disk recorder that performs record by optical modulation and performs reproduction of recorded information on the basis of a recording condition according to the recorded information, test writing is performed on a medium for optical recording and reproducing while changing a recording laser power parameter with respect to a shortest mark, the test writing is reproduced, a recording laser power parameter by which the quality of a reproduced signal has been increased is selected, test writing is performed while changing the recording pulse parameter with respect to the mark, and thus a recording laser power control parameter by which a desired quality (jitter or bit error rate) of a reproduced signal can be obtained is decided.

However, in the known method of optimizing a recording condition, if a characteristic of one or a plurality of components (for example, drive or media) that form an optical recording system is extremely poor, the quality of recording may not satisfy a predetermined level even if the recording is performed with optimal recording laser power and recording pulse condition. Furthermore, long adjustment time, large adjustment region, and the like are needed to optimize a plurality of recording conditions.

In addition, a PRML (partial response and maximum likelihood) method is adopted as a sign identification method of a high density recording system that uses a blue laser. In the PRML method, since sign identification is performed on the basis of amplitude information of an RF signal obtained by reproducing a recording pulse pattern, it is necessary to set a recording condition by the use of an evaluation index different from that in the related art in order to realize high-quality or stable recording.

SUMMARY OF CERTAIN INVENTIVE ASPECTS

It is an object of the invention to provide a new evaluation index in order to realize high-quality and stable recording.

Further, it is another object of the invention to provide a technique of optimizing a recording condition on a media by introducing a new evaluation index.

Furthermore, it is still another object of the invention to provide a technique of optimizing recording laser power with respect to a media by introducing a new evaluation index.

In addition, it is still another object of the invention to provide a technique of optimizing a parameter, which has a large effect on quality of recording, by introducing a new evaluation index when optimizing a recording condition on a media.

According to a first aspect of the invention, an apparatus for optical information recording and reproducing includes: a measurement means for recording codes including a specific code (for example, a code of 2T (where, T is unit time)) in a medium for optical information recording and reproducing, reproducing the codes from the medium for optical information recording and reproducing, and measuring, from a reproduced signal of the codes, a peak value of amplitude of a reproduced signal related to the specific code, the peak value being a maximum value or a minimum value of the amplitude of the reproduced signal related to the specific code; and a statistic calculation means for calculating preset statistic (for example, a maximum value, a minimum value, an average value, or a dispersion) by using a plurality of peak values at the same or different recording places, the plurality of peak value having been obtained by the measurement means.

The inventors have adopted the above-described configuration, since they found out that it has not been obvious that the peak value and the statistic thereof serving as a new evaluation index are effective for evaluation of the apparatus for optical information recording and reproducing or setting of a recording condition to be described later.

Further, in the apparatus for optical information recording and reproducing according to the first aspect of the invention, it is preferable to further include a condition decision means for deciding at least one of a recording laser power condition and a recording pulse condition by using the statistic. Thus, it is possible to perform optimal recording by properly adjusting the recording laser power condition or the recording pulse condition. In addition, in the case of deciding the recording laser power condition, for example, adjustment of the recording pulse condition (including a last pulse and a middle pulse) or adjustment of phase deviation can be more properly performed.

Furthermore, in the apparatus for optical information recording and reproducing according to the first aspect of the invention, it is preferable to further include a condition decision means for deciding at least one of a recording laser power condition and a recording pulse condition by using the statistic and a value of the amplitude level of a predetermined code included in the codes. Thus, a more proper recording condition can be set.

Here, the value of the amplitude level may be a maximum value of the amplitude level and a minimum value of the amplitude level of a reproduced signal related to anyone of a 5T (T is unit time) code to a longest code. In this case, the condition decision means may calculate a value of beta from the maximum value of the amplitude level and the minimum value of the amplitude level and decide at least one of the recording laser power condition and the recording pulse condition by using the value of beta and the statistic, the value of beta indicating positional relationship among amplitude levels.

In addition, the value of the amplitude level may be a maximum value of the amplitude level and a minimum value of the amplitude level of a reproduced signal related to at least two kinds of predetermined codes. In this case, the condition decision means may calculate a value of the asymmetry from the maximum value of the amplitude level and the minimum value of the amplitude level and decide at least one of the recording laser power condition and the recording pulse condition by using the value of the asymmetry and the statistic, the value of the asymmetry indicating positional relationship among levels.

Furthermore, in the apparatus for optical information recording and reproducing according to the first aspect of the invention, it is preferable to further include a means for determining whether or not recording is to be performed that determines whether or not predetermined quality of recording is obtainable under a specified recording condition based on at least one of a measurement result of the measurement means, the statistic calculated by the statistic calculation means, and at least one of processing and a processing result of the condition decision means.

Furthermore, in the apparatus for optical information recording and reproducing according to the first aspect of the invention, it is preferable to further include a recording processing means for, when the means for determining whether or not recording is to be performed determines that the predetermined quality of recording is not obtainable under the specified recording condition, performing one of reducing a recording data rate, stopping the recording, and asking a user whether to perform the recording or not. Thus, it becomes possible to cope with a trouble at the time of recording.

Furthermore, in the apparatus for optical information recording and reproducing according to the first aspect of the invention, it is preferable to further include a means for displaying, on a display device, at least one of a determination result of the means for determining whether or not recording is to be performed and a processing result of the recording processing means. Accordingly, the determination result or the processing result is notified to a user, the user can clearly see the situation.

Furthermore, in the apparatus for optical information recording and reproducing according to the first aspect of the invention, it is preferable to further include a means that stores at least one of data during processing and a processing result in a memory or the medium for optical information recording and reproducing. By storing the data, it is possible to set a recording condition that is suitable for subsequent processes. In addition, by omitting a part of the processes, the recording condition can be set quickly.

In addition, in the apparatus for optical information recording and reproducing according to the first aspect of the invention, it is preferable to further include a memory that stores beforehand reference values (for example, a target value, an upper limit, or a lower limit) with respect to the statistic. In this case, the condition decision means may decide at least one of the recording laser power condition and the recording pulse condition on the basis of the reference values stored in the memory. Thus, it is possible to determine whether or not a recording condition is proper.

According to a second aspect of the invention, there is provided a medium for optical information recording and reproducing apparatus that is recorded with codes including a specific code and is also recorded with at least one of a reference value corresponding to statistic of a peak value of amplitude of a reproduced signal related to the specific code and information (for example, an amount of adjustment of a recording condition or a recommended value) on a recording condition, the reproduced signal being obtainable when the codes are reproduced from the medium for optical information recording and reproducing apparatus and the peak value being either a maximum value or a minimum value of amplitude of the reproduced signal related to the specific code. Thus, the data recording based on a separate medium for optical information recording and reproducing or the same kind of medium for optical information recording and reproducing is properly performed.

Further, according to a third aspect of the invention, a method for optical information recording and reproducing includes: a measurement step of recording codes including a specific code in a medium for optical information recording and reproducing, reproducing the codes from the medium for optical information recording and reproducing, and measuring, from a reproduced signal of the codes, a peak value of amplitude of a reproduced signal related to the specific code, the peak value being a maximum value or a minimum value of the amplitude of the reproduced signal related to the specific code; and a statistic calculation step of calculating preset statistic by using a plurality of peak values at the same or different recording places, the plurality of peak value having been obtained in the step.

The variations on the apparatus for optical information recording and reproducing according to the first aspect of the invention may be applied to the method for optical information recording and reproducing according to the third aspect of the invention.

Furthermore, a program causing a computer to execute the above-described method for optical information recording and reproducing may be created. The program is stored in a storage or a storage medium, such as a flexible disk, CD-ROM, a magneto-optical disk, a semiconductor memory, or a hard disk, or a central processing unit having a memory, for example. In addition, the program may be distributed as a digital signal through a network, for example. In addition, an intermediate processing result is temporarily stored in a work memory allocation of various devices.

As described above, according to the aspect of the invention, a new evaluation index that has not been known is used to realize high-quality and stable recording.

In addition, according to another aspect of the invention, the recording condition on the media can be optimized by introducing the new evaluation index.

In addition, according to still another aspect of the invention, the recording laser power with respect to the media can be optimized by introducing the new evaluation index.

In addition, according to still another aspect of the invention, by introducing the new evaluation index in order to optimize the recording condition on the media, it is possible to properly optimize a parameter which has a large effect on other parameters to be adjusted.

BRIEF DESCRIPTION OF THE DRAWINGS

FIG. 1 is a view explaining a recording pulse in embodiments of the invention;

FIG. 2 is a view illustrating a main process flow in embodiments of the invention;

FIG. 3 is a functional block diagram according to an embodiment of the invention;

FIG. 4 is a view illustrating a process flow in a first embodiment of the invention;

FIG. 5 is a view explaining a peak value in an embodiment of the invention;

FIG. 6 is a view explaining an amount of difference between peak values in an embodiment of the invention;

FIG. 7 is a view explaining a value of the asymmetry;

FIG. 8 is a view illustrating adjustment of recording laser power in the first embodiment of the invention;

FIG. 9 is a view illustrating adjustment of recording laser power in the first embodiment of the invention;

FIG. 10 is a view illustrating a process flow in a second embodiment of the invention;

FIG. 11 is a view explaining a dispersion of peak values in the second embodiment of the invention;

FIG. 12 is a view explaining a dispersion value in the second embodiment of the invention;

FIG. 13 is a view explaining a value of the asymmetry in the second embodiment of the invention;

FIG. 14 is a view illustrating the structure of data stored in a disk in a third embodiment of the invention; and FIG. 15 is a functional block diagram in the case when using a personal computer.

DETAILED DESCRIPTION OF THE PREFERRED EMBODIMENT

Hereinafter, an example of the configuration of a recording pulse in embodiments of the invention will be described with reference to FIG. 1. In the embodiments of the invention, an example of using a multi pulse type including a plurality of pulse patterns is illustrated. As shown in FIG. 1, a recording pulse 10 includes a top pulse 12 disposed at the head and a subsequent pulse 14 subsequent to the top pulse 12. In addition, the subsequent pulse 14 includes a middle pulse 15 subsequent to the top pulse 12 and a last pulse 16 disposed at a last part of the recording pulse 10.

Here, assuming that the length of the recording pulse 10 is nT, the top pulse 12 has a length of mT and the subsequent pulse 14 has a length of (n-m) T. In the embodiment of the invention, it is assumed that m is 2 and n is a value in a range of 2 to 11. 'T' is unit time defined in an optical disk system, and a period is decided by a clock signal.

A condition of the recording pulse 10 is decided by performing test recording under a state in which a rewritable media is mounted in a drive.

Here, an amount of energy of the overall recording pulses is specified by the height indicated by laser peak power PW, and an amount of energy at an initial stage supplied to a front end of a mark is specified by the length indicated by a top pulse width Ttop. Preferably, the laser peak power PW is a highest value of the recording pulse 10, and the width Ttop of the top pulse is a width corresponding to a shortest mark having a length of 2T. It can be seen that the shortest-width recording pulse appears most frequently and has a large effect on the quality of recording. Therefore, it is preferable to set an optimal condition of the laser power PW or the width Ttop of the top pulse 12.

A width Tmp of the middle pulse 15 located between the top pulse 12 and the last pulse 16 or a duty ratio of the width Tmp and a distance Tsmp between middle pulses is specified as a condition of the middle pulse 15 so as to prevent the mark from being teardrop shaped.

The condition of the last pulse 16 is decided by adjusting a width Tlast of the last pulse 16 disposed at the last part of the recording pulse 10. The condition decision of the subsequent pulses including the middle pulses 15 and the last pulse 16 are made with a condition of the top pulse as a reference.

Next, a process of deciding the condition of a recording pulse will be described with reference to FIG. 2. Here, there is shown an example of a method in which test recording is performed by using recording pulse patterns including a plurality of kinds of codes and the recording condition is decided on the basis of a result of the test recording. First, for example, a laser power condition on the top pulse 12 is decided (step S100). The laser power condition of the overall recording pulse 10 is set by setting a laser power condition of a code which includes only the top pulse 12 and has a length of 2T. The step S100 will be described in detail later because the step S100 is a main process in the embodiment of the invention.

Thereafter, test recording is performed by using the laser power condition decided in the step S100, thereby determining the recording condition of the last pulse 16 (step S200). The setting of the condition of the last pulse is made by adjusting the width of the last pulse under the state in which conditions of the top pulse 12 and the middle pulse 15 are fixed to predetermined conditions. In the present embodiment, since codes having a length of 3T or more use the last pulse 16, the codes are adjusted. In order to adjust the last pulse for example, a condition is obtained in which a value of the asymmetry 2T3T indicating asymmetry of an amplitude value of the shortest code 2T and an amplitude value of the next shortest code 3T becomes a proper value, such as 0. Here, it is possible to obtain a condition in which a bit error rate becomes a minimum.

Then, the test recording is performed by using the laser power condition obtained in the step S100 and the last pulse obtained in the step S200, thereby deciding the recording condition of a middle pulse (step S300). The setting of the middle pulse is made by adjusting the widths of separate pulses forming the middle pulse. In the present embodiment since codes having a length of 4T or more use the middle pulse 15, the codes are adjusted. In order to adjust the middle pulse, for example, a condition is obtained in which a value of the asymmetry 2T11T indicating asymmetry of the amplitude value of the shortest code 2T and an amplitude value of a longest code 11T becomes a proper value, such as '0'. Here, it is possible to obtain a condition in which a bit error rate becomes a proper value such as '0'.

The condition of each of the recording pulses included in the recording pulse pattern is decided by performing the above steps S100 to S300. Then, phase deviation of a required recording pulse is corrected by performing the test recording on the basis of the determined condition of the recording pulse (step S400). The phase deviation correction is performed by adjusting the start position and end position of a recording pulse to be corrected. The recording pulse to be corrected is specified by test recording that uses a plurality of kinds of recording pulse patterns. In addition, as an index of the phase deviation correction, a value of the asymmetry or a bit error rate may be used.

By performing the above-described procedures for deciding the condition of a recording pulse, it is possible to perform data recording on a media in a drive while maintaining a proper quality of recording.

Setting of a Laser Power Condition in an Embodiment of the Invention

1. Configuration of a Drive in an Embodiment of the Invention

Hereinafter, a functional block diagram of drive and system according to an embodiment of the invention will be described with reference to FIG. 3. The drive and system according to the embodiment of the invention includes an apparatus for optical information recording and reproducing 100 and an I/O system 130, the I/O system 130 including a display part 131, such as a television set, and an operation part 132, such as a remote controller.

The apparatus for optical information recording and reproducing 100 includes: a memory 127 that stores data being processed, data of a processing result, or reference data used in processing; a CPU (central processing unit) 125 including a memory circuit 126 in which a program causing processing to be described below to be performed is recorded; an interface part (I/F) 128 that interfaces with the I/O system 130; a detecting part of characteristic value 124 that detects, for example, a peak value of an RF signal which is a reproduced signal; a slicer 122 and a data demodulator 123 that perform, for example, a process of demodulating any of 2T to 11T codes from an RF signal which is a reproduced signal; a pickup part 110, laser diode (LD) driver 121, rotational control part and motor (not shown) for a disk 150, and a servo control part (not shown) for the pickup part 110.

In addition, the pickup part 110 includes an objective lens 114, a beam splitter 116, a detection lens 115, a collimating lens 113, a laser diode (LD) 111, and a photodetector (PD) 112. In the pickup part 110, an actuator (not shown) operates under the control of the servo control part (not shown) so as to perform focusing and tracking.

The CPU 125 is connected to the memory 127, the detecting part of characteristic value 124, the I/F 128, the LD driver 121, the rotational control part (not shown), the servo control part (not shown), and the like. Moreover, the detecting part of characteristic value 124 is connected to the PD 112, the CPU 125, and the like. The LD driver 121 is connected to the CPU 125 and the LD 111. The CPU 125 is also connected to the I/O system 130 through the I/F 128.

Next, an outline of a processing in the case of recording data with the disk 150 will be described. First, a data modulator (not shown) provided in the CPU 125 or separately provided performs modulation processing using, for example, an ETM method, with respect to data to be recorded onto the disk 150 and then outputs the data after the modulation processing to the LD driver 121. The LD driver 121 drives the LD 111 with the received data on the basis of a specified recording condition, such that a laser beam is output. The laser beam is irradiated onto the disk 150 through the collimating lens 113, the beam splitter 116, and the objective lens 114, and as a result, a land and a pit are formed on the disk 150.

Subsequently, an outline of a processing in the case of reproducing data recorded on the disk 150 will be described. The LD driver 121 drives the LD 111 in response to an instruction from the CPU 125 such that a laser beam is output. The laser beam is irradiated onto the disk 150 through the collimating lens 113, the beam splitter 116, and the objective lens 114. A reflected light from the disk 150 is input to the PD 112 through the objective lens 114, the beam splitter 116, and the detection lens 115. The PD 112 converts the reflected light from the disk 150 into an electrical signal and then outputs the electrical signal to the detecting part of characteristic value 124, the slicer 122, and the like. The slicer 122 and the data demodulator 123 performs predetermined demodulation processing on the output reproduced signal and then outputs the demodulated data to the display part 131 of the I/O system 130 through the CPU 125 and the I/F 128, such that reproduced data is displayed. Since the detecting part of characteristic value 124 is not used in general reproduction, an operation of the detecting part of characteristic value 124 will be described later.

2. Process of Setting a Laser Power Condition in a First Embodiment of the Invention Hereinafter, a process in a first embodiment of the invention will be described with reference to FIGS. 4 to 9. First, the CPU 125 reads out a specified test recording condition stored in, for example, the memory 127 and sets the specified test recording condition in the LD driver 121 (step S101). The test recording condition includes a laser power condition. In addition, the CPU 125 causes the LD driver 121 to perform test recording on the disk 150 (step S103). The shape of a recording pulse in the test recording is a pulse train type multi pulse. Alternatively, the recording pulse in the test recording may be a non-multi pulse having a simple shape. In addition, the recording pulse pattern may be a random pattern or a specific pattern for test recording. In addition, the 2T code is included in a recording pulse pattern for the purpose of use in subsequent processes. The specific pattern for test recording is formed by combination of codes and the like used in the subsequent processes. In addition, the specific pattern for test recording may be recorded at one place or several times at a plurality of different places.

Next, the CPU 125 performs a process of detecting an evaluation parameter necessary for evaluation and correction of a recording condition (step S105). Specifically, the CPU 125 instructs the LD driver 121 to reproduce recorded data, and then the LD driver 121 causes the LD 111 to irradiate a laser beam onto the disk 150 at reproduction strength. The laser beam is irradiated onto the disk 150 through the collimating lens 113, the beam splitter 116, and the objective lens 114. A reflected light from the disk 150 is input to the PD 112 through the objective lens 114, the beam splitter 116, and the detection lens 115. The PD 112 converts the reflected light from the disk 150 into an electrical signal and then outputs the electrical signal to the detecting part of characteristic value 124 as an RF signal. The detecting part of characteristic value 124 detects a peak value of amplitude from the RF signal and then outputs the detected peak value to the CPU 125. In addition, the slicer 122 and the data demodulator 123 specify any one of the 2T to 11T codes corresponding to the input RF signal and output specified code data to the CPU 125. The CPU 125 associates the peak value of amplitude with a code corresponding to the peak value and stores the peak value of amplitude and the code corresponding to the peak value in the memory 127, for example.

The above process in the step S105 may be performed by addressing into a recorded portion of the recording pulse pattern in the step S103 after completion of the recording operation in the step S103. In addition, the process in the step S105 may be performed by using a main laser spot or subsequent sub-spot simultaneously while the step S103 is being performed. When recording pulse patterns are recorded on a plurality of different portions, the recording pulse patterns are reproduced once, for example. In addition, when a recording pulse pattern is recorded on only a portion, the recording pulse pattern is reproduced a predetermined number of times.

An evaluation parameter in the present embodiment is a peak value of amplitude of a necessary specified code (for example, 2T code) of 2T to 11T codes (for example, when modulation using ETM method is performed) and statistic (in particular, maximum value, minimum value, and amount of difference therebetween) thereof, in an RF signal which is a reproduced signal. Here, the peak value of amplitude will be explained.

FIG. 5 is a conceptual view illustrating a reproduced signal a (RF signal) obtained by recording continuous patterns of specific single codes (for example, 5T). A vertical axis of FIG. 5 indicates a peak value [V] and a horizontal axis indicates time. In the present embodiment, a peak value of amplitude is either an amplitude value at which the amplitude of a reproduced signal becomes the maximum (convex) or an amplitude value at which the amplitude of the reproduced signal becomes the minimum (concave).

As shown in FIG. 5, the peak value of the amplitude of the reproduced signal is not necessarily constant. In particular, in the case of a reproduced signal obtained by recording code patterns including a plurality of codes not the continuous patterns of single codes described above, the peak value of amplitude may fluctuate easily due to an effect of code patterns positioned before and behind a code. In addition, in the case of the disk 150 on which data is recorded, if incident laser power of an irradiated laser beam is excessive or deficient as compared with an optimal amount, it is difficult that the movement or distribution of heat when the recording is performed becomes uniform. This may be a cause of the change (fluctuation) of the peak value of amplitude.

In FIG. 5, the reproduced signal obtained by recording the continuous patterns of single codes has been shown for the convenience of explanation. However, the present embodiment can be applied to a case in which the reproduced signal is recorded as a recording pulse pattern (for example, a random pattern or a pattern in which a plurality of codes are arranged in a predetermined order) including a plurality of codes in the same manner as actual data recording. In this case, a reproduced signal based on a specific code whose peak value of amplitude needs to be obtained is detected from a pattern including a plurality of codes and then the peak value of amplitude is specified on the basis of the reproduced signal that has been detected.

Further, in the present embodiment, an amount of difference between a maximum value and a minimum value of a peak value of amplitude is calculated. As shown in FIG. 6, peak values of amplitude of a reproduced signal based on a specific code (for example, 2T) are deviated from one another when the peak values are arranged. Accordingly, the maximum value and the minimum value are detected from the peak values and then the amount of difference between the maximum value and the minimum value is calculated.

Alternatively, the specification may be made by adding a value of the asymmetry to the amount of difference between peak values of amplitude, the value of the asymmetry having been used as an evaluation parameter in the related art and indicating the positional relationship among amplitude levels of codes. FIG. 7 illustrates amplitude levels (I2, I3, and I11) when DC coupling RF signals of 2T code, 3T code, and 11T code. For example, a value of the asymmetry of 2T11T is calculated. Here, it is possible to calculate another value of the asymmetry without being limited to the value of the asymmetry of 2T11T. Since the value of the asymmetry has been known, a method of calculating the value of the asymmetry will not be explained herein.

Alternatively, the specification may be made by calculating a value of beta, which indicates the positional relationship among amplitude levels, on the basis of maximum and minimum values of the amplitude level of a reproduced signal based on any one of the 5T to 11T codes and then adding the value of beta to the amount of difference between peak values of amplitude. Since the value of beta has been known, a method of calculating the value of beta will not be explained herein.

Next, the CPU 125 determines whether to adjust a recording condition (here, laser power condition) or not on the basis of reference data stored in the memory 127 (step S107). The reference data is, for example, a target value (for example, an upper limit; however, a lower limit may be set) with respect to the amount of difference between peak values of amplitude. For example, FIG. 8 illustrates a case in which the recording laser power as a recording condition selected in the step S103 and the amount of difference (detection value) specified in the step S105 are plotted on a graph in which a vertical axis is the amount of difference and a horizontal axis is the recording laser power. In FIG. 8, a straight line representing a target value which is an upper limit on the amount of difference is shown. If the amount of difference is plotted below the straight line, a condition on the amount of difference is satisfied even though it is not clear whether or not the amount of difference is an optimal value. That is, the recording laser power as the recording condition selected in the step S103 can be determined to be proper. On the other hand, as shown in FIG. 8, if the amount of difference is plotted above the straight line representing the target value which is the upper limit, the recording laser power as the recording condition selected in the step S103 can be determined not to be proper.

Moreover, in the step S107, it may be possible to determine whether or not the adjustment is needed by using the value of the asymmetry or the value of beta calculated in the step S105.

If it is determined that the recording laser power is not proper, the CPU 125 decides an amount of correction of the recording condition on the basis of the reference data (step S109).

In the case described with reference to FIG. 8, the relation (here, a straight line c) between recording laser power and a value of the asymmetry (for example, a value of the asymmetry of 2T11T) shown in FIG. 9 is stored beforehand in the memory 127 as reference data, a value of the recording laser power PW2 expected to cause the value of the asymmetry to be, for example, 0 is specified on the basis of the straight line c and relation between a value of the recording laser power PW1 as a recording condition selected in the step S103 and the amount of difference specified in the step S105, and a difference between the value of the recording laser power PW2 and the value of the recording laser power PW1 as the recording condition selected in the step S103 is specified as an amount of adjustment of laser power. Further, by performing the steps S101 to S105, it is checked whether or not the amount of difference has been actually reduced as expected. Although an example of using a value of the asymmetry has been described above, the adjustment may be made by using a value of beta.

Alternatively, data indicating a trend of variation of the amount of difference with respect to variation of the recording laser power, which is shown by a curve b in FIG. 8, is stored as reference data, and then a difference between recording laser power, at which the amount of difference becomes a minimum on the curve b, and the recording laser power as the recording condition selected in the step S103 is specified as an amount of adjustment of laser power. In general, the curve b is not decided uniformly. Accordingly, an amount of adjustment of laser power may be specified as the curve b and then the steps S101 to S105 may be performed again, thereby specifying the curve b again in a step in which a second detection value or a detection value subsequent thereto is obtained. In any cases, it is preferable to check whether or not the amount of difference has been actually reduced by performing the steps S101 to S105.

In addition, even when an amount of difference below the target value is specified, the amount of adjustment of laser power may be calculated to specify a value of the recording laser power at which the amount of difference becomes further reduced. That is, in the step S107, the determination may be made on the basis of whether or not it is necessary to lower an amount of difference as well as whether or not the amount of difference is below the target value. In addition, in the case when the number of executions made in the step S109 is counted and the amount of difference does not fall below the target value even if a predetermined limited number of executions has been made, it is determined that subsequent processing is not further performed. Furthermore, for example, even in the case when an initial amount of difference obtained in the step S105 exceeds another reference value for error determination which is different from the target value described above, it is determined that the subsequent processing is not further performed.

Alternatively, after performing the processes in the steps S101 to S105 at least twice, the curve b shown in FIG. 8 or the straight line c shown in FIG. 9 may be specified and the amount of adjustment of laser power may be estimated.

If the amount of correction of a recording condition is decided in the step S109, the process returns to the step S101 in which the amount of correction (in the present embodiment, the amount of adjustment of laser power) of the recording condition determined in the step S109 is reflected on the test recording condition, and then the processes in the steps S101 to S109 are performed.

On the other hand, if it is determined that it is not necessary to adjust the recording condition in the step S107, the CPU 125 determines whether or not recording on the disk 150 is to be performed (step S111). In the step S111, the amount of adjustment of laser power, the amount of difference between peak values of amplitude, and the like are compared with reference values (in the case of specifying a range, an upper limit and a lower limit) that are stored in the memory 127 so as to make a determination on whether or not recording is to be performed, thereby determining whether or not the sufficient quality of recording above a predetermined reference can be obtained. In this case, it may be possible to prepare a plurality of reference values used to make a determination on whether or not recording is to be performed and then specify any one of 'recordable at a specified recording data rate', 'recordable at a data rate lower than the specified recording data rate', and 'unrecordable'. In the case when recording cannot be performed at the specified recording data rate, for example, 'recording at a data rate lower than a specified recording data rate' and 'record discontinuance' may be displayed on the display part 131 through the I/F 128 such that either 'recording at a data rate lower than a specified recording data rate' or 'record discontinuance' is selected, and then a selection instruction from the operation part 132 may be received through the I/F 128. In addition, it may be possible to aid the selection of a user by displaying, for example, total time required for data recording. In addition, the 'low-speed recording' may be performed with levels divided. In this case, reference values corresponding to the levels are prepared and the determination is made by comparison with the reference values.

Alternatively, the determination in the step S111 may be made on the basis of other parameters as well as the parameters described above.

Here, if it is determined to be record stop (step S121: Yes), the process proceeds to step S129. If it is determined that the recording is performed at a recording data rate lower than the specified recording data rate (step S123: Yes) not the record stop (step S121: No), the data recording is performed at a data rate decided beforehand as a low data rate or a data rate of a level decided in the step S111 (step S125). Since general recording processing has been known in the related art, an explanation thereof will be omitted. Then, the process proceeds to step S129.

In the present embodiment, if the low-speed recording is not performed in the step S123 (step S123: No), the recording processing is performed at the specified recording data rate (step S127). Since the processing has also been known in the related art, an explanation thereof will be omitted. Then, the process proceeds to step S129.

After performing record discontinuance or recording at a predetermined data rate, the CPU 125 causes predetermined information to be displayed on the display part 131 through the I/F 128 and predetermined historical data to be stored in the memory 127 (step S129). For example, a determination result such as media ID or recording data rate, details of the adjustment, a processing result, and the above-specified information are displayed on the display part 131. This allows a user to obtain information on which kind of recording has been performed or whether or not a large amount of laser power adjustment has been needed, which may be used as a basis for selecting the disk 150. In addition, data, which is required to effectively perform subsequent recording and adjustment processing, including the determination result such as media ID or recording data rate, details of the adjustment, the processing result, and the above-specified information is stored in the memory 127.

By storing the data in the memory 127, it becomes possible to omit a process of calculating an amount of difference because, for example, an average of past amounts of difference can be used in the case of the same media ID. Moreover, in the case of the same media ID, even if the recording condition is set with reference to an average value of past amounts of adjustment of laser power based on history of an amount of adjustment of laser power, the number of test recordings can be reduced. Such a function may be realized by the CPU 125.

In addition, the above-described data may be stored in the disk 150 instead of the memory 127 or stored in the memory 127 and the disk 150. In the case when the data is stored in the disk 150, for example, an ID of the apparatus for optical information recording and reproducing 100 is stored instead of the above-mentioned media ID of preservation data with respect to the memory 127. Thus, in the case of the write-once type disk 150 or the like, data related to recording that is stored in the disk 150 can be used when data recording is performed again by the apparatus for optical information recording and reproducing 100 having an ID equal to that of the apparatus for optical information recording and reproducing 100 stored in the disk 150, and accordingly, the recording and adjustment processing can be efficiently performed.

By performing the processing described above, the adjustment of the recording laser power included in the recording condition can be properly performed. Further, since it is possible to evaluate the recorded state prior to actual data recording (or while data is being recorded) and perform the adjustment of a required recording condition on the basis of a result of the evaluation, a user can safely record important data.

Moreover, processes in the steps S111 to S129 are performed after performing adjustments (for example, steps S200 to S400 shown in FIG. 2) which are not related to the recording laser power. It is needless to say that when the adjustment of the recording condition has been completed by adjustment of only the recording laser power, the processes in the steps S111 to S129 may be preferably performed without performing the adjustments which are not related to the recording laser power.

Furthermore, the above-described processing based on the peak value of amplitude may be applied to adjustment of a recording pulse as well as the adjustment of the recording laser power. For example, while performing test recording by gradually changing the width of a recording pulse, it is possible to adopt the recording pulse width when the statistic, such as an amount of difference between peak values of amplitude or a dispersion thereof, is proper.

In addition, in the present embodiment, an example has been described in which the apparatus for optical information recording and reproducing 100 performs all processes. However, for example, the processes up to the step S105 may be performed by the apparatus for optical information recording and reproducing 100 and the other processes may be performed by another apparatus. Moreover, only a result of the process in the step S105 may be used for the evaluation of the apparatus for optical information recording and reproducing 100.

Furthermore, even though an example has been shown in which either a maximum value or a minimum value is used as the peak value of amplitude, both the maximum value and the minimum value may be used. For example, with a middle value between a highest value of maximum values and a lowest value of minimum values as a reference, an absolute value of a difference therebetween may be considered in the same manner as the peak value. Furthermore, an average value of statistic of maximum values and statistic of minimum values, an average value of maximum values and statistic of minimum values, or the like may be used. The same is true for the following embodiments.

3. Process of Setting a Laser Power Condition in a Second Embodiment of the Invention Hereinafter, an example in which a laser power condition included in a recording condition is set by using processing different from that shown in FIG. 4 will be described with reference to FIGS. 10 to 13.

In the present embodiment, the processing is performed on the basis of a dispersion of peak values of amplitude instead of the amount of difference between peak values of amplitude.

First, the CPU 125 reads out a specified test recording condition (including a laser power condition) stored in, for example, the memory 127 and sets the specified test recording condition in the LD driver 121 (step S151). The step S151 is repeatedly performed. Accordingly, for example, in the case when a desirable result cannot be obtained in the current range, another test recording condition may be specified or added while a test is being performed, in addition to the specified test recording condition stored in the memory 127. In addition, the CPU 125 causes the LD driver 121 to perform test recording on the disk 150 (step S153). The shape of a recording pulse in the test recording is a pulse train type multi pulse. Alternatively, the recording pulse in the test recording may be a non-multi pulse having a simple shape. In addition, the recording pulse pattern may be a random pattern or a specific pattern for test recording. In addition, the 2T code is included in a recording pulse pattern for the purpose of use in subsequent processes. The specific pattern for test recording is formed by combination of codes and the like used in the subsequent processes. In addition, in the present embodiment, since the test recording needs to be performed under a plurality of recording conditions obtained by changing the laser power condition, the processes in the steps S151 and S153 are repeated according to the number of recording conditions.

Next, the CPU 125 performs a process of detecting an evaluation parameter necessary for evaluation and correction of a recording condition (step S155). Specifically, the CPU 125 instructs the LD driver 121 to reproduce recorded data, and then the LD driver 121 causes the LD 111 to irradiate a laser beam onto the disk 150 at reproduction strength. The laser beam is irradiated onto the disk 150 through the collimating lens 113, the beam splitter 116, and the objective lens 114. A reflected light from the disk 150 is input to the PD 112 through the objective lens 114, the beam splitter 116, and the detection lens 115. The PD 112 converts the reflected light from the disk 150 into an electrical signal and then outputs the electrical signal to the detecting part of characteristic value 124 as an RF signal. The detecting part of characteristic value 124 detects a peak value of amplitude from the RF signal and then outputs the detected peak value to the CPU 125. In addition, the slicer 122 and the data demodulator 123 specify any one of the 2T to 11T codes corresponding to the input RF signal and output specified code data to the CPU 125. The CPU 125 associates the peak value of amplitude with a code corresponding to the peak value and stores the peak value of amplitude and the code corresponding to peak value in the memory 127, for example.

The process in the step S155 is performed by addressing into a recorded portion of the recording pulse pattern in the step S153 after the completion of the recording operation in the step S153. Here, the step S153 (recording) and the step S155 (reproduction) may be alternately performed, for example, in the order of 'recording→reproduction→recording→reproduction→recording→reproduction→recording→reproduction . . . ', or the step S153 may be continuously performed, for example, in the order of 'recording→recording→recording→reproduction . . . ' and then the step S155 may be performed.

An evaluation parameter in the present embodiment is a peak value of amplitude of a necessary specified code (for example, 2T code) of codes 2T to 11T (for example, when modulation using ETM method is performed) and statistic (in particular, dispersion, mean deviation (average of an absolute value of deviation), standard deviation, or the like) thereof, in an RF signal which is a reproduced signal. Specification of a peak value of amplitude is the same as in the first embodiment.

Moreover, in the present embodiment, a dispersion of peak values of amplitude and statistic thereof are calculated. As shown in FIG. 11, even if recording conditions including recording laser power are equal, the occurrence probability of peak values of amplitude of a reproduced signal based on a specific code (for example, 2T) and statistic thereof varies. Accordingly, a value corresponding to variation, such as dispersion or mean deviation, is calculated. The value, such as the dispersion, is calculated for each recording condition (specifically, for each test value of recording laser power).

Alternatively, the specification may be made by adding a value of the asymmetry to the dispersion of peak values of amplitude, the value of the asymmetry having been used as an evaluation parameter in the related art and indicating the positional relationship among amplitude levels of codes. For example, a value of the asymmetry of 2T11T is calculated. Here, it is possible to calculate another value of the asymmetry without being limited to the value of the asymmetry of 2T11T.

Alternatively, the specification may be made by calculating a value of beta, which indicates the positional relationship among amplitude levels, on the basis of maximum and minimum values of the amplitude level of a reproduced signal based on any one of the codes 5T to 11T and then adding the value of beta to the peak value of amplitude, statistic thereof, or the like.

Next, the CPU 125 decides recording laser power as a recording condition (step S157). Specifically, as shown in FIG. 12, recording laser power and a dispersion value at the time of each test recording are plotted on a graph in which a horizontal axis is the recording laser power and a vertical axis is a dispersion, and thus it is possible to obtain a curve indicating the relation between recording laser power and a dispersion, which is shown by a curve d. Here, a value of recording laser power which is positioned below the target value and at which the dispersion becomes minimal is specified. Even if the curve is not obtained, it may be possible to specify a value of recording laser power, which is positioned below the target value and at which the dispersion becomes minimal at a plotted point thereof. In addition, the points on the graph shown in FIG. 12 may not be plotted at once. That is, by performing the steps S151 and S153 several times, it may be possible to specify the value of recording laser power at which the dispersion becomes minimal by degrees.

For example, as shown in FIG. 13, in the case when the value of the asymmetry is also calculated in the step S155, it is possible to obtain a straight line f, which indicates the relation between recording laser power and a value of the asymmetry, on a graph in which a horizontal axis is recording laser power and a vertical axis is the value of the asymmetry. In FIG. 13, a plurality of points are plotted. However, for example, test recording by which two points can be plotted is first performed and then a straight line of forecast of a value of the asymmetry is generated by connecting the two points. Thereafter, recording laser power at which a value of the asymmetry becomes '0' is specified on the basis of the straight line of forecast of a value of the asymmetry, and then test recording is performed again with the specified recording laser power. Thus, it is possible to check whether or not a dispersion has lowered as expected. If the dispersion has lowered as expected, recording laser power at that time is adopted. Alternatively, in FIGS. 12 and 13, it may be possible to specify optimal recording laser power after increasing the number of plots. In other words, processing, such as the test recording, may be performed by more precisely modifying the curve d and the straight line f and then specifying recording laser power at which the value of the asymmetry becomes '0' on the basis of the modified straight line f.

Then, if the above processes need to be repeated, the process returns to the step S151 (step S159). This depends on a policy of whether to lower the dispersion value by repetition or to perform test all at once without repeatedly performing the above processes.

In addition, in the case when a recording condition satisfying the target value cannot be found even if the steps S151 to S157 are repeated, an error is output. In this case, the process may proceed to step S171, for example.

On the other hand, if it is determined that it is not necessary to adjust the recording condition in the step S159, the CPU 125 determines whether or not recording on the disk 150 is to be performed (step S161). In the step S161, the dispersion of peak values of amplitude, recording laser power (or a difference between normal recording laser power and the recording laser power decided in the step S157), and the like are compared with reference values (in the case of specifying a range, an upper limit and a lower limit) that are stored in the memory 127 so as to make a determination on whether or not recording is to be performed, thereby determining whether or not the sufficient quality of recording above a predetermined reference can be obtained. In this case, it may be possible to prepare a plurality of reference values used to make a determination on whether or not recording is to be performed and then specify any one of 'recordable at a specified recording data rate', 'recordable at a data rate lower than the specified recording data rate', and 'unrecordable'. In the case when recording cannot be performed at the specified recording data rate, for example, 'recording at a data rate lower than a specified recording data rate' and 'record discontinuance' may be displayed on the display part 131 through the I/F 128 such that either 'recording at a data rate lower than a specified recording data rate' or 'record discontinuance' is selected, and then a selection instruction from the operation part 132 may be received through the I/F 128. In addition, the 'low-speed recording' may be performed with levels divided. In this case, reference values corresponding to the levels are prepared and the determination is made by comparison with the reference values.

Alternatively, the determination in the step S161 may be made on the basis of other parameters as well as the parameters described above.

Here, if it is determined to be record stop (step S163: Yes), the process proceeds to step S171. If it is determined that the recording is made at a recording data rate lower than the specified recording data rate (step S165: Yes) not the record stop (step S163: No), the data recording is performed at a data rate decided beforehand as a low data rate or a data rate of a level decided in the step S161 (step S167). Since general recording processing has been known in the related art, an explanation thereof will be omitted. Then, the process proceeds to step S171.

In the present embodiment, if the low-speed recording is not performed in the step S165 (step S165: No), the recording processing is performed at the specified recording data rate (step S169). Since the processing has also been known in the related art, an explanation thereof will be omitted. Then, the process proceeds to step S171.

After performing record discontinuance or recording at a predetermined data rate, the CPU 125 causes predetermined information to be displayed on the display part 131 through the I/F 128 and predetermined historical data to be stored in the memory 127 (step S171). For example, a determination result such as media ID or recording data rate, details of the adjustment or setting, a processing result, and the above-specified information are displayed on the display part 131. This allows a user to obtain information on which kind of recording has been performed or whether or not a large amount of laser power adjustment has been needed, which may be used as a basis for selecting the disk 150. In addition, data, which is required to effectively perform subsequent recording and adjustment processing, including the determination result such as media ID or recording data rate, details of the adjustment, the processing result, and the above-specified information is stored in the memory 127.

By storing the data in the memory 127, it becomes possible to omit a process of calculating the dispersion because, for example, an average of past dispersion values can be used in the case of the same media ID. Moreover, in the case of the same media ID, even if the recording condition is set with reference to an average value of past recording laser power based on history of recording laser power, the number of test recordings can be reduced. Such a function may be realized by the CPU 125.

In addition, the above-described data may be stored in the disk 150 instead of the memory 127 or stored in the memory 127 and the disk 150. In the case when the data is stored in the disk 150, for example, an ID of the apparatus for optical information recording and reproducing 100 is stored instead of a media ID. Thus, in the case of the write-once type disk 150 or the like, data related to recording that is stored in the disk 150 can be used when data recording is performed again, and accordingly, recording and adjustment processing can be efficiently performed.

By performing the processing described above, the adjustment of the recording laser power included in the recording condition can be properly performed. Further, since it is possible to evaluate the recorded state prior to actual data recording (or while data is being recorded) and perform the adjustment of a required recording condition on the basis of a result of the evaluation, a user can safely record important data.

Moreover, processes in the steps S161 to S171 are performed after performing adjustments (for example, steps S200 to S400 shown in FIG. 2) which are not related to the recording laser power. It is needless to say that when the adjustment of the recording condition has been completed by adjustment of only the recording laser power, the processes in the steps S161 to S171 may be preferably performed without performing the adjustments which are not related to the recording laser power.

Furthermore, the above-described processing based on the peak value of amplitude may be applied to adjustment of a recording pulse as well as the adjustment of the recording laser power. For example, while performing test recording by gradually changing the width of a recording pulse, it is possible to adopt the recording pulse width when the statistic, such as a dispersion of peak values of amplitude, is proper.

In addition, in the present embodiment, an example has been described in which the apparatus for optical information recording and reproducing 100 performs all processes. However, for example, the processes up to the step S155 may be performed by the apparatus for optical information recording and reproducing 100 and the other processes may be performed by another apparatus. Moreover, only a result of the process in the step S155 may be used for the evaluation of the apparatus for optical information recording and reproducing 100.

4. Third Embodiment

In the above embodiments, an example has been described in which reference data and reference values, such as a target value, are stored in the memory 127; however, the reference data and the reference value are not necessarily stored in the memory 127. For example, the reference data and reference values may be stored in the disk 150. In the case when the reference data and reference values are stored in the disk 150, the reference data and reference values are stored in a Lead-in area shown in FIG. 14. The Lead-in area is mainly divided into a system Lead-in area, a connection area, and a data Lead-in area. The system Lead-in area includes an initial zone, a buffer zone, a control data zone, and a buffer zone. Further, the connection area includes a connection zone. Furthermore, the data Lead-in area includes a guard track zone, a disc test zone, a drive test zone, a guard track zone, an RMD duplication zone, a recording management zone, an R-physical format information zone, and a reference code zone. In the present embodiment, a recording condition data zone 170 is included in the control data zone of the system Lead-in area.

The recording condition data zone 170 is stored with data that used to be stored in the memory 127, specifically, reference values (for example, a target value, an upper limit, or a lower limit) with respect to statistic (for example, a difference between a maximum value and a minimum value, an average value, a dispersion, or a mean deviation) of peak values of amplitude, recommended recording laser power or an amount of adjustment in a standard recording condition, and the like, such that the reference values and the recommended recording laser power or the amount of adjustment in the standard recording condition can be read out as necessary. As for the values to be recorded, average values of the disk 150 may be uniformly registered or values corresponding to a result of a test of the disk 150 before shipping may be registered.

If the values corresponding to the disk 150 on which recording has been performed as described above are stored in the disk 150, drive-side processing load may be reduced.

In addition, the data to be stored in the step S171 or S129 may also be stored in the same zone.

5. Fourth Embodiment

In the first and second embodiments, an example has been described in which a television set and a remote controller are considered as the I/O system 130; however, as shown in FIG. 15, a personal computer 180 may be connected. Alternatively, the apparatus for optical information recording and reproducing 100 may be formed integrally with a personal computer.

In the case shown in FIG. 15, the personal computer 180 includes a display part 181, an input part 182 such as a keyboard or a mouse, and a recording processing part 183 realized by executing software. The recording processing part 183 communicates with the CPU 125 through the I/F 128. For example, the recording processing part 183 receives display data and then displays the display data on the display part 181 or receives an input from the input part 182 and then outputs the input to the CPU 125. Further, the recording processing part 183 may be formed integrally with a known disk writer and software, for example.

Moreover, the CPU 125 may perform up to the detection of a peak value of amplitude or the calculation of statistic of peak values of amplitude and output a result of the calculation to the recording processing part 183, and then the recording processing part 183 may perform the processes described above.

By performing the processes described above, a plurality of parameters included in a recording condition (write strategy) can be specify or independently corrected and a condition in which high-quality recording is possible can be specified with adjustment of a small number of parameters. This is particularly effective for a case in which the processes shown in FIG. 2 are performed and the recording laser power is set in the method described above.

Therefore, even in a high density recording system such as DVD, HD-DVD, or Blu-ray, mark and space can be precisely formed. Particular in a recording and reproducing system that uses PRML signal processing, it is possible to obtain the high quality of recording, such as a low bit error rate or a wide margin.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An apparatus for optical information recording and reproducing comprising:
   a light source and control circuitry configured to record one or more specific codes in a medium for optical information recording and reproducing;
   a photodetector and detection circuitry configured to reproduce the codes from the medium;
   a processing circuitry configured to measure, from a reproduced signal of the codes, multiple peak values of amplitude of the reproduced signal, each of the peak values being defined as an amplitude value at which the amplitude of the reproduced signal reaches a maximum or convex point, or each of the peak values being defined as an amplitude value at which the amplitude of the reproduced signal reaches a minimum or concave point, wherein multiple maximum or convex points or multiple minimum or concave points of the amplitude of the reproduced signal are measured;
   a statistic calculation circuit configured to calculate a statistic by using the multiple peak values at the same or different recording places; and
   a condition decision circuit configured to decide at least one of a recording laser power condition and a recording pulse condition by using the statistic.

2. The apparatus for optical information recording and reproducing according to claim 1, wherein
   the condition decision circuit is configured to decide at least one of a recording laser power condition and a recording pulse condition by using the statistic and a value related to the amplitude level of a predetermined code included in the codes.

3. The apparatus for optical information recording and reproducing according to claim 2,
   wherein the value related to the amplitude level is a maximum value of the amplitude level or a minimum value of the amplitude level of a reproduced signal related to a code of a length no less than 5T, and
   wherein the condition decision circuit calculates a value of beta from the maximum value of the amplitude level and the minimum value of the amplitude level and decides at least one of the recording laser power condition and the recording pulse condition by using the value of beta and the statistic, the value of beta indicating positional relationship among amplitude levels.

4. The apparatus for optical information recording and reproducing according to claim 2,
   wherein the value related to the amplitude level is a maximum value of the amplitude level or a minimum value of the amplitude level of a reproduced signal related to at least two kinds of predetermined codes, and
   the condition decision circuit calculates a value of the asymmetry from the maximum value of the amplitude level and the minimum value of the amplitude level and decides at least one of the recording laser power condition and the recording pulse condition by using the value of the asymmetry and the statistic, the value of the asymmetry indicating positional relationship among amplitude levels.

5. The apparatus for optical information recording and reproducing according to claim 1, further comprising:
   a circuit configured to determine whether or not recording is to be performed, the circuit determining whether or not a predetermined quality of recording is obtainable under a specified recording condition based on at least one of a measurement result of the measurement circuit, the statistic calculated by the statistic calculation circuit, and at least one processing result of the condition decision circuit.

6. The apparatus for optical information recording and reproducing according to claim 5, further comprising:
   a recording processing circuit configured to, when the determining circuit determines that the predetermined quality of recording is not obtainable under the specified recording condition, perform one of the following: reducing a recording data rate, stopping the recording, and asking a user whether to perform the recording or not.

7. The apparatus for optical information recording and reproducing according to claim 6, further comprising:
   a display part configured to display at least one of a determination result of the determining circuit and a processing result of the recording processing circuit.

8. The apparatus for optical information recording and reproducing according to claim 1, further comprising:

a storing circuit configured to store at least one of data during processing and a processing result, in a memory or the optical medium.

9. The apparatus for optical information recording and reproducing according to claim 1, further comprising:
a memory that stores reference values with respect to the statistic,
wherein the condition decision circuit decides at least one of the recording laser power condition and the recording pulse condition based at least in part on the reference values stored in the memory.

10. A method of optical information recording and reproducing, comprising:
recording one or more specific codes on a medium for optical information recording and reproducing;
reproducing the codes from the medium;
measuring, from a reproduced signal of the codes, multiple peak values of amplitude of a reproduced signal, each of the peak values being defined as an amplitude value at which the amplitude of the reproduced signal reaches a maximum or convex point, or each of the peak values being defined as an amplitude value at which the amplitude of the reproduced signal reaches a minimum or concave point, wherein multiple maximum or convex points or multiple minimum or concave points of the amplitude of the reproduced signal are measured;
calculating a statistic by using the multiple peak values at the same or different recording places; and
deciding at least one of a recording laser power condition and a recording pulse condition by using the statistic.

11. The method for optical information recording and reproducing according to claim 10, wherein
the at least one of a recording laser power condition and a recording pulse condition is decided by using the statistic and a value related to the amplitude level of a predetermined code included in the codes.

12. The method for optical information recording and reproducing according to claim 11,
wherein the value related to the amplitude level is a maximum value of the amplitude level and a minimum value of the amplitude level of a reproduced signal related to a code of a length no less than 5T, and the deciding of at least one of a recording laser power condition and a recording pulse condition comprises:
calculating, a value of beta from the maximum value of the amplitude level and the minimum value of the amplitude level and at least one of the recording laser power condition; and
deciding the recording pulse condition by using the value of beta and the statistic, the value of beta indicating positional relationship among amplitude levels.

13. The method for optical information recording and reproducing according to claim 11,
wherein the value related to the amplitude level is a maximum value of the amplitude level and a minimum value of the amplitude level of a reproduced signal related to at least two kinds of predetermined codes, and the deciding of at least one of a recording laser power condition and a recording pulse condition comprises:
calculating a value of the asymmetry from the maximum value of the amplitude level and the minimum value of the amplitude level and at least one of the recording laser power condition; and
deciding the recording pulse condition by using the value of the asymmetry and the statistic, the value of the asymmetry indicating positional relationship among amplitude levels.

14. The method for optical information recording and reproducing according to claim 10, further comprising:
determining whether or not recording is to be performed by determining whether or not a predetermined quality of recording is obtainable under a specified recording condition based on at least one of the following: the measured peak values of amplitude of the reproduced signal, the calculated statistics, and the decided recording laser power condition or recording pulse condition.

15. The method for optical information recording and reproducing according to claim 14, further comprising:
a recording processing step of, when it is determined that the predetermined quality of recording is not obtainable under the specified recording condition, performing one of the following: reducing a recording data rate, stopping the recording, and asking a user whether to perform the recording or not.

16. The method for optical information recording and reproducing according to claim 15, further comprising:
displaying, on display device, at least one of a determination result as to whether or not recording is to be performed and a processing result in the recording processing step.

17. The method for optical information recording and reproducing according to claim 10, further comprising:
storing at least one of data during processing and a processing result in a memory or the medium for optical information recording and reproducing.

18. The method for optical information recording and reproducing according to claim 10,
wherein the at least one of the recording laser power condition and the recording pulse condition is decided on the basis of reference values stored in a memory, the memory storing beforehand the reference values with respect to the statistic.

19. A computer-readable medium having stored thereon instructions configured to cause a computer to perform the method for optical information recording and reproducing according to claim 10.

20. An apparatus for optical information recording and reproducing comprising:
means for recording one or more specific codes on a medium for optical information recording and reproducing;
means for reproducing the codes from the medium;
means for measuring, from a reproduced signal of the codes, multiple peak values of amplitude of a reproduced signal, each of the peak values being defined as an amplitude value at which the amplitude of the reproduced signal reaches a maximum or convex point, or each of the peak values being defined as an amplitude value at which the amplitude of the reproduced signal reaches a minimum or concave point, wherein multiple maximum or convex points or multiple minimum or concave points of the amplitude of the reproduced signal are measured;
means for calculating a statistic by using the one or more peak values at the same or different recording places; and
means for deciding at least one of a recording laser power condition and a recording pulse condition by using the statistic.

* * * * *